United States Patent [19]
Jonsson

[11] 3,835,287
[45] Sept. 10, 1974

[54] APPARATUS FOR AUTOMATIC ELECTRIC ARC WELDING

[76] Inventor: Sven Jonas Roland Jonsson, 11, Manstigen, S-695 00, Laxa, Sweden

[22] Filed: June 28, 1973

[21] Appl. No.: 374,758

[30] Foreign Application Priority Data
June 30, 1972 Sweden............................. 8644/72

[52] U.S. Cl................................ 219/130, 219/131 F
[51] Int. Cl............................................. B23k 9/12
[58] Field of Search ............ 72/160, 161, 162, 163, 72/164, 165; 219/130, 131 F, 136

[56] References Cited
UNITED STATES PATENTS

| | | |
|---|---|---|
| 1,714,094 | 5/1929 | Kilmer ................................ 72/162 |
| 2,310,916 | 2/1943 | Gaines et al. ........................ 72/161 |
| 3,007,033 | 10/1961 | Newman et al. ................ 219/130 X |
| 3,128,369 | 4/1964 | Pilia et al. ....................... 219/130 X |

Primary Examiner—E. A. Goldberg
Assistant Examiner—N. D. Herkamp
Attorney, Agent, or Firm—Cameron, Kerkam, Sutton, Stowell & Stowell

[57] ABSTRACT

A welding head for automatic electric arc welding with a bare, fusible electrode having a circular cross-section, comprising a wire advancing mechanism, a welding nozzle, and a wire straightening assembly arranged between said wire advancing mechanism and said nozzle, said assembly consisting of two aligned units operating in planes at right angles to each other.

3 Claims, 3 Drawing Figures

APPARATUS FOR AUTOMATIC ELECTRIC ARC WELDING

BACKGROUND OF THE INVENTION

This invention relates to apparatus for automatic arc welding with a bare, consumable wire electrode having a circular cross-section. Apparatus of this kind are provided with a wire feeding mechanism comprising at least one driven feed roll for advancing the electrode towards the welding area. More particularly, the invention relates to apparatus which in addition to a wire feeding mechanism also comprises a wire straightening unit comprising a set of straightener rolls.

In existing apparatus of this type, the wire feeding mechanism is arranged to pull the wire through the straightening unit. To improve the straightening action, two straightening units are sometimes used through which the wire is pulled successively, said two straightening units being arranged one behind the other and set transversely to each other to straighten the wire in two planes at right angles to each other. Nevertheless, the straightening action is frequently inadequate, with the result that the tip of the electrode performs irregular lateral movements during the welding process. This difficulty is particularly pronounced in welding with a long electrode extension, and also in welding with two electrodes advanced parallelly or convergingly towards a workpiece so as to produce a common welding pool, as in that case the spacing between the electrode tips must be kept within narrow limits.

SUMMARY OF THE INVENTION

The invention has for its principal purpose to eliminate or to reduce the drawbacks above referred to by the provision of apparatus capable of producing a better approach to the desired absolute straightness of the welding wire.

To that end, the invention provides, in apparatus for automatic electric arc welding with a bare, consumable wire electrode having a circular cross-section, electrode advancing and straightening means comprising a wire feeding mechanism provided with at least one driven feed roll, a first wire straightening unit arranged to receive the wire pushed forward by said wire feeding mechanism and comprising a set of idling straightener rolls arranged to operate in a common plane, and a second wire straightening unit aligned with said first wire straightening unit so as to receive the wire emerging from said wire straightening unit, said second wire straightening unit comprising a set of idling straightener rolls arranged to operate in a common plane at right angles to the operating plane of said first wire straightening unit.

The term "idling" is meant to indicate that the straightener rolls are actuated by no driving means but are free to rotate under the action of the electrode wire.

A preferred embodiment of the invention shall now be described with reference to the accompanying drawings.

DESCRIPTION OF THE PREFERRED EMBODIMENT

Figure 1:
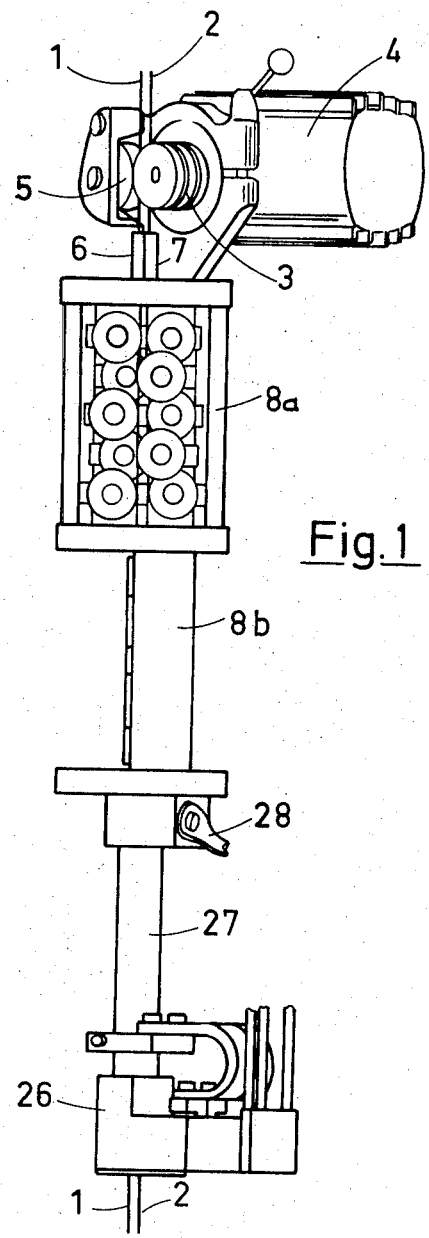
FIG. 1 is an elevational view of an automatic welding head according to the invention.

The welding head represented in FIG. 1 is designed to operate with a pair of tubular, cylindrical electrodes 1, 2 supplied to the welding head from a pair of reels (not shown). A motor 4 equipped with suitable speed reduction gear operates a feed roll 3 provided with a pair of circumferential grooves into which the electrodes 1, 2 are pressed by a spring-actuated counter roll 5. On emerging from between said rolls the wires enter a wire straightening assembly 8a, 8b through a pair of straight guide tubes 6, 7. Said wire straightening assembly comprises two wire straightening units 8a, 8b of substantially identical design arranged one on top of the other. The upper unit 8a comprises a set of five straightener rolls 9 to 13 acting on the electrode 1 and a set of five straightener rolls 14 to 18 acting on the electrode 2. The rolls 9 to 13 operate in a common plane, and the rolls 14 to 18 operate in a comcom plane parallel to and spaced from the operating plane of the rolls 9 to 13. The rolls are provided with a semicircular groove 19 for the wire and are mounted on slide members 21 each of which is adjustable by means of a screw 20. Each roll constitutes the outer ring 22 of a ball bearing the inner ring 23 of which is fitted on to a projection 24 on the slide 21 and secured in position by a screw 25.

Figure 2:
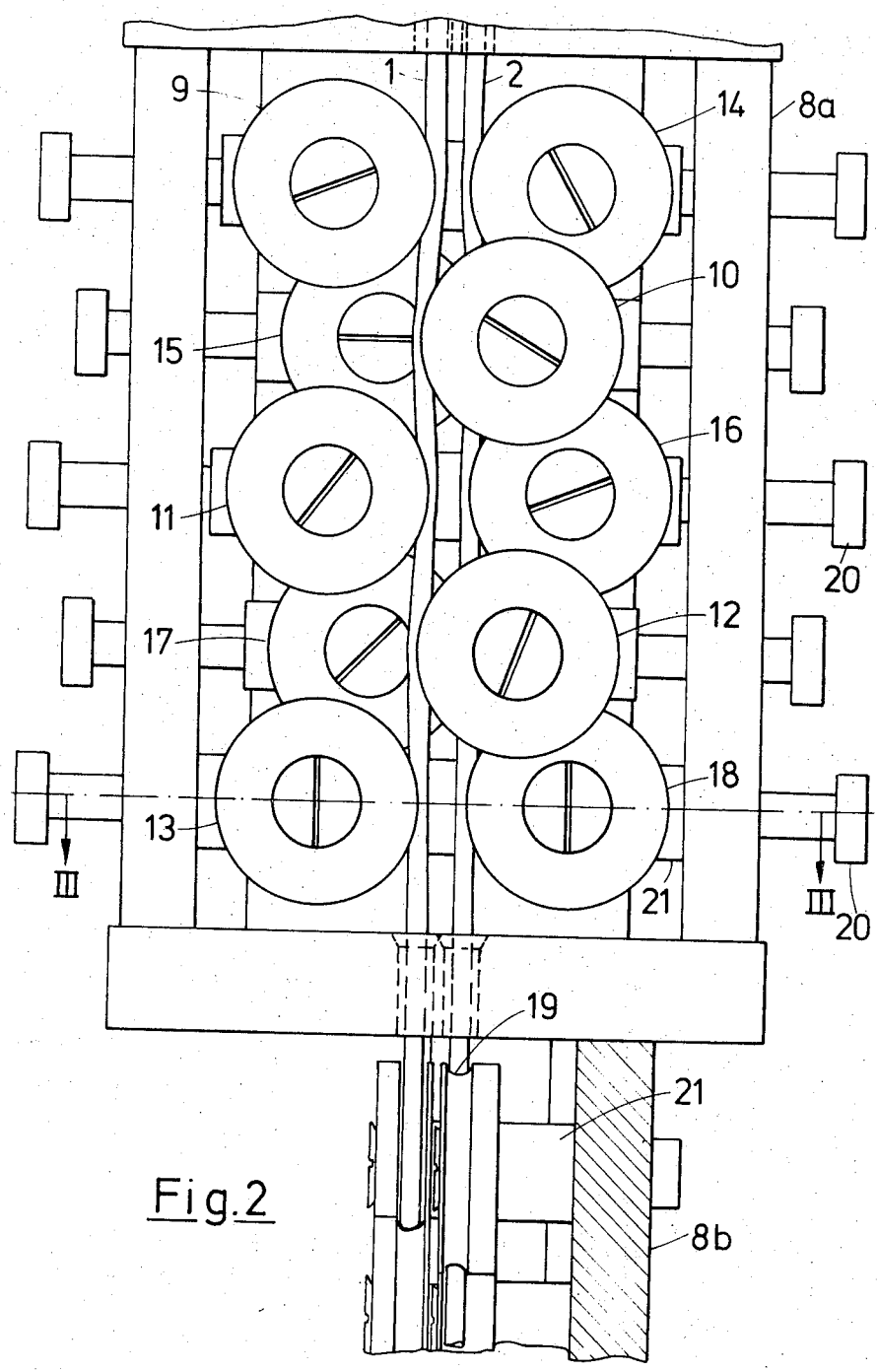
FIG. 2 is an elevational view of part of the welding head of FIG. 1 represented in more detail and on a larger scale, partially in vertical section.
Figure 3:
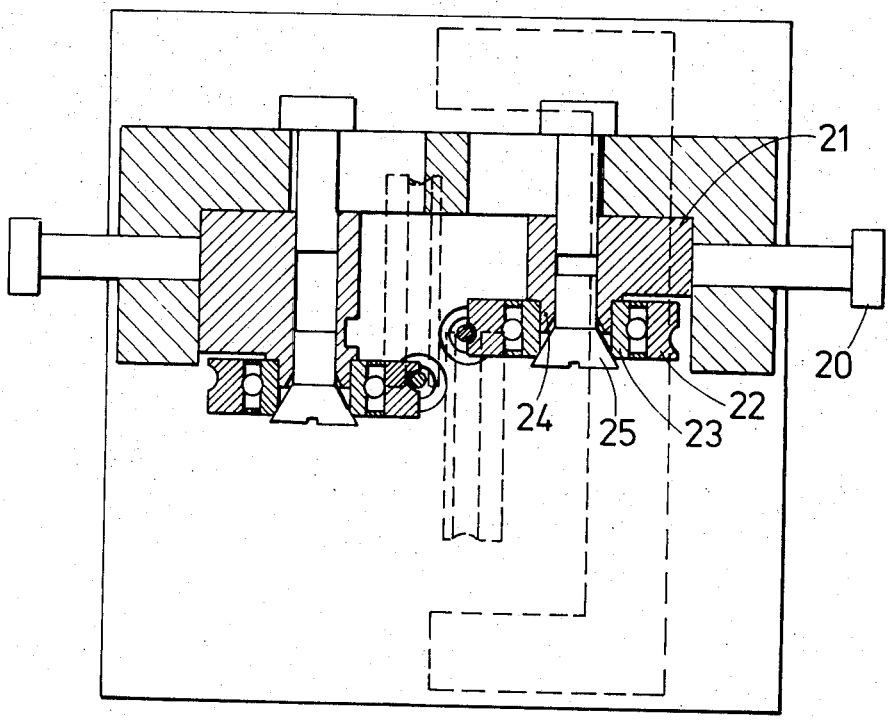
FIG. 3 is a sectional view taken along the line III—III of FIG. 2 and on the same scale as FIG. 2.

The spacing of the operating planes of the sets of rolls of the unit 8a (see FIG. 3) is equal to the spacing of the operating planes of the rolls of the unit 8b (see FIG. 2). The lateral spacing of the rolls 13, 18 determined by the screws 20 controlling their respective slides is adjusted so as to make the plane through the axes of the wires 1, 2 engaging the grooves of said rolls form an angle of 45° with the operating planes of the rolls (see FIG. 3). The lateral spacing of the upper pair of rolls of the lower unit 8b is adjusted accordingly so as to make the wires 1, 2 run parallelly to each other during their passage from the upper unit 8a to the lower unit 8b.

A contact nozzle assembly 26 of the kind described and claimed in my U.S. Pat. application Ser. No. 371,310 is attached to the lower extremity of a tube 27 the upper extremity of which is attached to the lower end of the straightening unit 8b and connected to a welding current conductor 28. The tube 27 is provided in its interior with suitable guide members forming passageways for the electrodes 1, 2.

The very effective straightening imparted to the wires 1, 2 in the welding head above described permits the use of a large electrode extension, or "stick-out". With tubular electrodes of 4 mm diameter, the spacing between the nozzle 26 and the workpiece can amount to 150 mm or more. The excellent straightness obtained is believed to be due at least partly to the fact that the electrodes are subjected to no deforming stresses during their passage from the straightening assembly to the nozzle assembly, in contradistinction to the performance of known apparatus in which the feed rolls pulling the wire through the straightening assembly will cause stresses and deformations which to some extent may undo the preceding straightening imparted to the wire.

I claim:

1. Apparatus for automatic electric arc welding with a bare, consumable wire electrode having a circular cross-section comprising
 a wire feeding mechanism consisting of at least one driven feed roll means,
 a first wire straightening unit arranged to receive the wire pushed forward by said wire feeding mechanism and comprising a set of idling straightener rolls arranged to operate in a common plane,
 a second wire straightening unit aligned with said first wire straightening unit so as to receive the wire emerging from said first wire straightening unit, said second wire straightening unit comprising a set of idling straightener rolls arranged to operate in a common plane at right angles to the operating plane of said first wire straightening unit, and
 a guide and contact nozzle arranged ahead of and aligned with said second straightening unit to receive the wire emerging therefrom.

2. Apparatus as claimed in claim 1 which comprises a rigid, straight tubular member connecting said guide and contact nozzle to said second straightening unit and defining a passageway for the wire.

3. Apparatus for automatic electric arc welding with a pair of bare, consumable wire electrodes having a circular cross-section comprising
 a wire feeding mechanism for advancing both of the wires, said mechanism consisting of feed roll means engaging the wires, a first wire straightening unit arranged to receive the wires pushed forward by said wire feeding mechanism and comprising a first set of idling straightener rolls arranged to operate in a common plane and a second set of idling straightener rolls arranged to operate in a common plane parallel to and spaced from the operating plane of said first set of straightener rolls, a second wire straightening unit aligned with said first wire straightening unit so as to receive the wires emerging from said first straightening unit and comprising a third set of idling straightener rolls arranged to operate in a common plane at right angles to the operating plane of said first set of straightener rolls and a fourth set of straightener rolls arranged to operate in common plane parallel to and spaced from the operating plane of said third set of straightener rolls, and a twin contact nozzle assembly arranged ahead of and aligned with said second straightening unit to receive the pair of wires emerging therefrom.

* * * * *

UNITED STATES PATENT OFFICE
CERTIFICATE OF CORRECTION

Patent No. 3,835,287    Dated September 10, 1974

Inventor(s) Sven Jonsson

It is certified that error appears in the above-identified patent and that said Letters Patent are hereby corrected as shown below:

ASSIGNEE - Elektriska Svetsningsaktiebolaget

Gothenburg, Sweden

Signed and sealed this 26th day of November 1974.

(SEAL)
Attest:

McCOY M. GIBSON JR.
Attesting Officer

C. MARSHALL DANN
Commissioner of Patents